United States Patent [19]

Ear

[11] 4,084,947
[45] Apr. 18, 1978

[54] FILTER APPARATUS FOR FAST FOOD KITCHENS EXHAUST

[76] Inventor: Frank P. Ear, 4326 Flint Hill, San Antonio, Tex. 78230

[21] Appl. No.: 704,741

[22] Filed: Jul. 12, 1976

[51] Int. Cl.² .................................................. B01D 46/04
[52] U.S. Cl. .................................. 55/242; 55/272; 55/467; 55/509; 55/DIG. 25; 55/DIG. 36; 126/299 D; 126/299 E
[58] Field of Search .................... 55/96, 242, 97, 233, 55/242, 272, 467, 487, 527, DIG. 25, DIG. 36, 509, 309; 98/115 K; 126/299 D, 299 E

[56] References Cited

U.S. PATENT DOCUMENTS

| Re. 18,328 | 1/1932 | Fedeler | 55/96 |
|---|---|---|---|
| 1,548,288 | 8/1925 | Smith | 55/97 |
| 1,935,813 | 11/1933 | Neveu | 55/309 |
| 2,794,514 | 6/1957 | Risley | 98/115 K |
| 2,970,671 | 2/1961 | Warner | 55/242 |
| 3,242,652 | 3/1966 | Malenchini | 55/DIG. 36 |
| 3,540,190 | 11/1970 | Brink, Jr. | 55/97 |
| 3,812,657 | 5/1974 | Lampinen | 55/233 |
| 3,891,417 | 6/1975 | Wade | 55/487 |

FOREIGN PATENT DOCUMENTS 1,345,155   1/1974   United Kingdom .................... 55/487

Primary Examiner—Bernard Nozick

[57] ABSTRACT

A method of removing aerosol particles as well as larger particles from the emissions of kitchens of restaurants, particularly those used in the fast food industry, comprising collecting the smoke and other gases rising from the kitchen cooking area and passing the smoke and other gases containing aerosol size liquid and solid particles through a coalescing filter which coalesces and removes from the air stream the aerosol particles of 3 microns and smaller as well as particles of larger size. The apparatus includes a hood positioned above the cooking area of a kitchen, a ventilation duct connected to the hood for conveying gases collected by the hood to the atmosphere outside of the kitchen, an aerosol particle coalescing filter enclosed within the ventilation duct, a blower connected with the ventilation duct for drawing gases from the hood through the duct and filter and for discharging the gases into the atmosphere outside of the kitchen. Additionally an automatic filter washer is provided to wash the coalescing filter at selected intervals.

6 Claims, 5 Drawing Figures

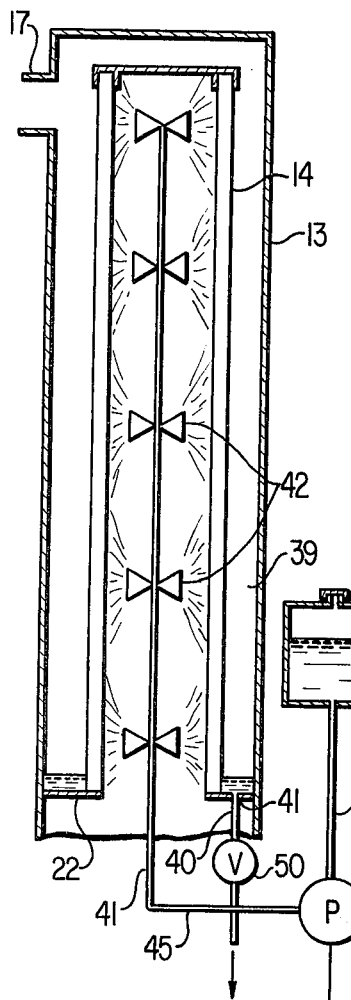
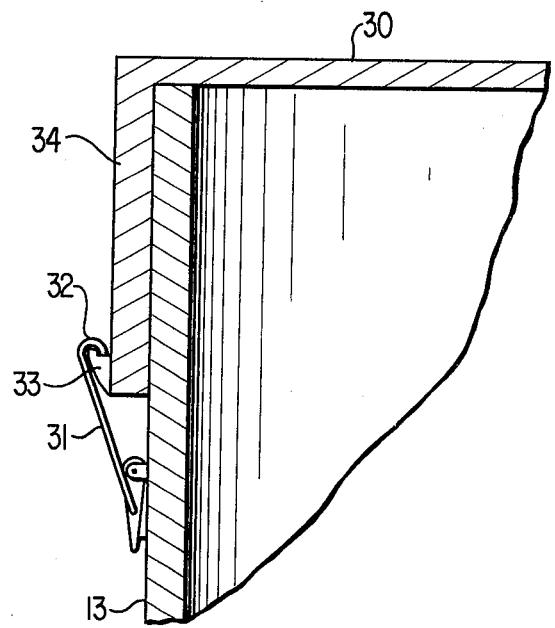
FIG. 3
FIG. 5

4,084,947

FILTER APPARATUS FOR FAST FOOD KITCHENS EXHAUST

BACKGROUND OF THE INVENTION

1. Field of the Invention

This invention relates to a method and apparatus for reducing the smoke and odor emissions from the kitchens of restaurants.

2. Description of the Prior Art

Ventilation systems for collecting and removing gases from the cooking area of a kitchen have long been known. The prior art systems vary from those which merely seek to remove the gases from the kitchen to more elaborate systems which seek to remove at least some part of the liquid and solid particles found in the gases before the gases are discharged into the atmosphere. Filters have long been used in domestic and commercial kitchen ventilator systems to remove grease from the gases passing through the ventilator system. Typically, the filters become filled with grease, and are a source of high risk from fire should the grease become ignited. The more elaborate kitchen ventilator systems include filter washers to periodically wash the filter. In large commercial kitchen ventilator systems after burners and electrostatic precipitators have been used to remove smoke and odors from the gases, but the high cost of energy and of maintenance required by these systems have deterred their use by the average restaurant operator.

When the Clean Air and Water Act was passed in 1970, standards for clean air were set by federal, state, and local governments which made most restaurant kitchen ventilator systems inadequate. As a consequence restaurant operators began to consult with restaurant kitchen ventilator system suppliers and found that easily maintained, and reasonably priced kitchen ventilator systems which would meet the new pollution control standards were unavailable.

It is recognized that coalescing filters are old in the art. A coalescing filter is one which causes small liquid particles carried by a fluid steam to collect on the filter and grow into larger particles. Frequently the larger particles of liquid become sufficiently heavy to flow by gravity to a collecting chamber or area. One coalescing filter which is commercially available is disclosed in U.S. Pat. No. 3,540,190 which was issued to Joseph A. Brink, Jr. on Nov. 17, 1970 and is assigned to Monsanto Enviro - Chem Systems, Inc. The filter disclosed in U.S. Pat. No. 3,540,190 has particular use in systems for the removal and recovery of acid mists from process streams but it is indicated to have applications of more general use.

SUMMARY OF THE INVENTION

This invention relates to a method and apparatus for removing aerosol particles from the emissions from the kitchens of restaurants, and particularly from the kitchens of the so called "fast food industry," such as hamburger shops, and the like.

It is an object of this invention to provide an efficient, economical, easily installed, and low maintenance pollution control method and apparatus which will remove aerosol particles from the emissions from kitchens of restaurants and particularly from the kitchens of the fast food industry. The fast food industry is particularly subject to pollution control problems because of the nature of the foods cooked and the method of cooking.

Most kitchens of the fast food industry cook hamburgers and steaks over a broiler. Fats and greases from the food being cooked fall onto the hot surfaces of the broiler where they partially burn and become aerosolized to very fine liquid and solid particles suspended in the hot gases rising from the broiler. Some of the particles are submicron in size and therefore they are difficult to remove from the gases entering the kitchen ventilation system.

It is a further object of this invention to provide a coalescing filter which will remove submicron and larger particles from the gases passing through the kitchen ventilator system.

It is still another object of this invention to provide a vertically oriented, annular, coalescing filter on which liquid particles coalesce and flow by gravity into a collecting chamber.

It is still another object of this invention to provide an automatic means for periodically washing the coalescing filter.

BRIEF DESCRIPTION OF THE DRAWINGS

With the foregoing more important objects and features in view and such other objects and features which may become apparent as this specification proceeds, the invention will be understood from the following description taken in conjunction with the accompanying drawings, in which like characters of reference are used to designate like parts, and in which:

FIG. 3 is an enlarged vertical sectional view of the upper right hand corner portion of the coalescent filter shown in FIG. 2;

FIG. 4 is a vertical sectional view of the top portion of a modified coalescent filter installation;

FIG. 5 is a schematic diagrammatic view showing an automatic washing system for the coalescent filter.

DESCRIPTION OF THE PREFERRED EMBODIMENTS

Figure 1:
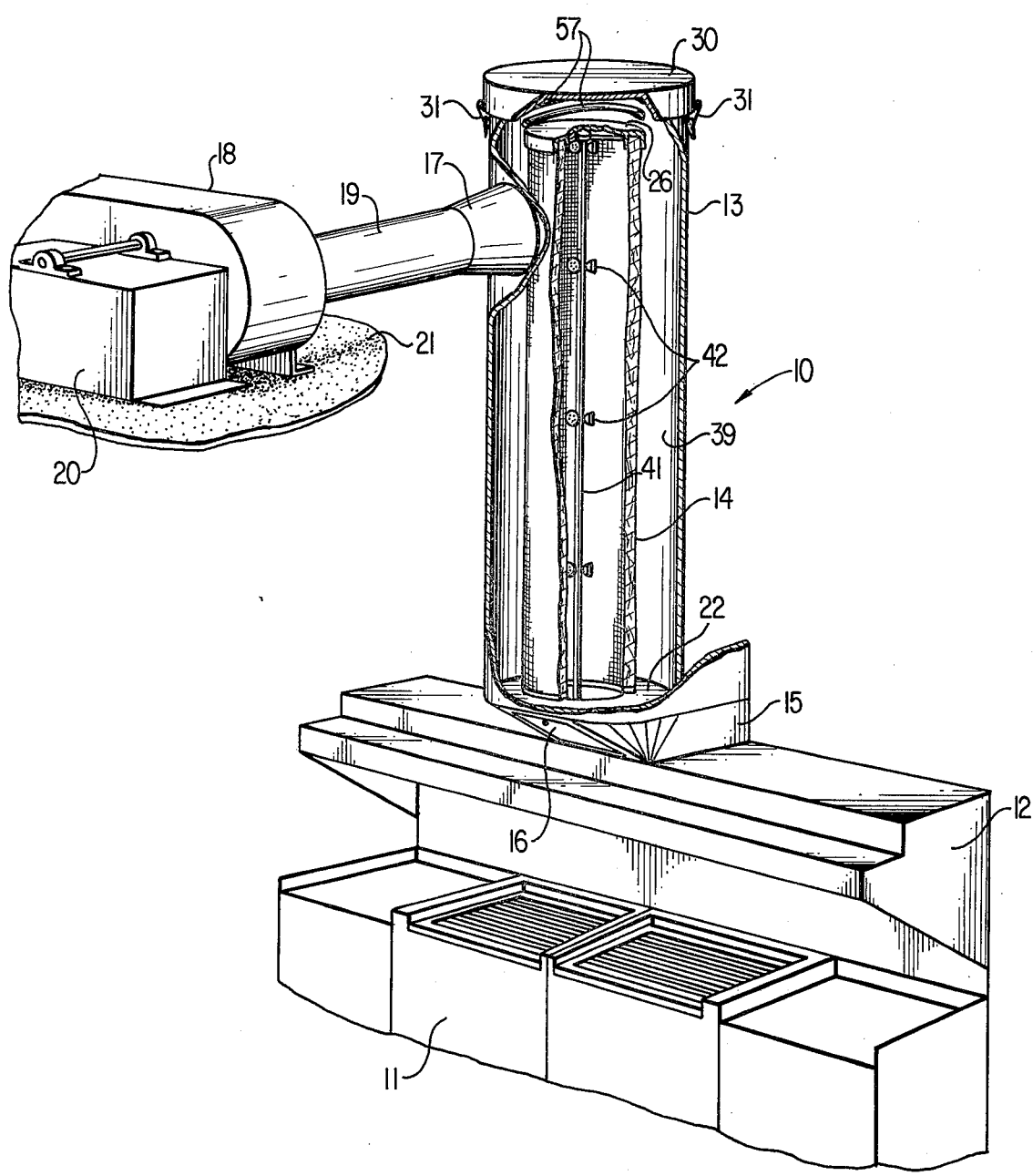
FIG. 1 is a perspective view of a kitchen ventilation system incorporating this invention and showing a vertically oriented coalescent filter partially broken away to expose the interior to view.
Figure 2:
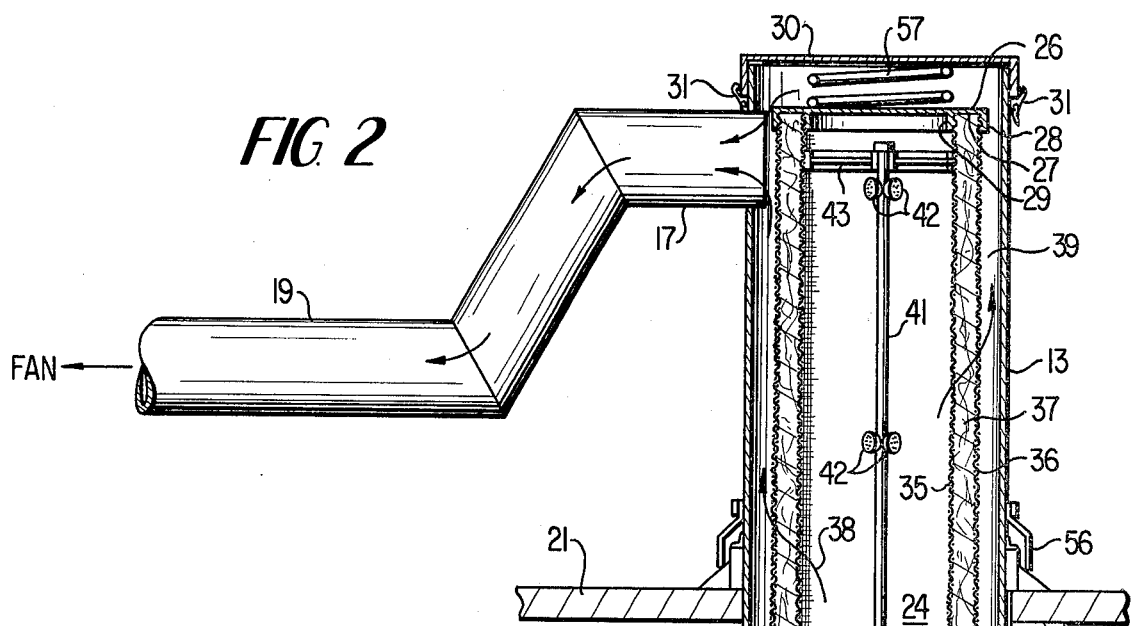
FIG. 2 is an enlarged vertical sectional view of the coalescent filter shown in FIG. 1.

Referring to the drawings and particularly to FIG. 1, the reference numeral 10 indicates generally a preferred embodiment of the pollution control system according to this invention. The pollution control system 10 includes a hood 12 for collecting gases from the area over a broiler 11 such as typically found in a fast food kitchen for cooking hamburgers, steaks and the like. Above the hood is mounted a vertically oriented and elongated cylindrical filter housing 13 having a cylindrical coalescent filter 14 mounted coaxially therein. The bottom end of the filter housing 13 is connected to the hood 12 by a transition conduit 15 which has an access opening 16 closed by a removable access cover plate 16' and a sealing gasket 16b. The top portion of the filter housing 13 has an outlet port 17 which is connected to a blower 18 by a ventilator duct 19. The blower 18 is driven by an enclosed electric motor 20. Both the motor and the blower are shown to be supported on the roof 21 of the fast food kitchen, and as seen in FIG. 2, the filter housing extends through the roof of the kitchen. The blower 18 produces a negative pressure in the ventilator system including the duct 19, filter housing 13, transition 15 and the hood 12, thus collecting and removing gases from over the broiler 11 and discharging the gases into the atmosphere outside of the kitchen.

Looking now at FIG. 2 the filter housing 13 has a bottom annular plate 22 in which there is a central opening 23 through which gases are admitted into the filter chamber 24 within the hollow cylindrical coalescing filter 14. The filter 14 rests on the bottom plate 22 surrounding the opening 23 and is sealed with respect to the plate by an intervening gasket 25. The top of the filter 14 is closed by a removable closure 26 which has an annular groove formed between depending annular flanges 28 and 29. The upper end of the filter 14 seats in the groove 28 and is effectively sealed with respect to the closure 26. The top of the filter housing 13 has a removable cap 30 which is held in place by toggle clamps 31. The toggle clamps 31 are pivotally attached to the housing 13 and have hooked ends 32 which engage abutments 33 near the bottom edge of the depending cap flange 34 (see FIG. 3). The elongated filter 14 comprises spaced inner and outer cylindrical screens 35 and 38. The annular space between the screens 35 and 36 is filled with a bed 37 of aerosol coalescing material, preferably unbonded glass fibers of a size and density in accordance with the disclosure of U.S. Pat. No. 3,540,190 previously mentioned. While the coalescent filter disclosed in U.S. Pat. No. 3,540,190 has been found to provide satisfactory results for use in this invention, other coalescent filter materials providing similar results may be substituted.

As aerosol laden gases rise through the filter chamber 24, they pass radially outwardly through the inner screen 35, glass fiber bed 37 and the outer screen 36 into the annular space 39 between the housing 13 and the filter 14. Aerosol particles which are in the gas stream passing through the filter 14 collect on the glass fibers of the filter and are retained thereon. The liquid aerosol particles coalesce and flow by gravity down the filter onto the plate 22. A drain pipe 40 communicates with a drain port 41 in the bottom plate 22 to drain the liquid collected on the plate 22 from the filter housing to a suitable waste receiver (not shown).

A vertical standpipe 41 is mounted coaxially within the filter 14 to provide means for periodically washing the filter. The standpipe rises through the filter inlet port 23 and extends substantially the full length of the filter. Plural sets of nozzles 42 are provided at vertically spaced intervals along the length of the standpipe. Each set of nozzles include plural nozzles which extend radially from the standpipe in the same plane, and which are angularly spaced so that the divergent spray pattern from one nozzle overlaps the spray pattern of the nozzles on each side of it both vertically and horizontally. In this way washing of the entire filter 14 is assured. A support spider 43 braces the upper end of the standpipe 41 within the filter 14. The standpipe 41 is connected to a pump 44 by a pipe 45, and the pump is in turn connected to a supply 46 of wash liquid 48 by means of a pipe 47. A timer 49 controls the pump 44 to periodically start and stop the pump at predetermined intervals to force wash liquid from the supply reservoir 46 under pressure to the nozzles 42 from which the wash liquid is sprayed in a divergent pattern against the inner surface of the filter 14. The force of the spray is sufficient to propel the wash liquid through the filter so that the wash liquid runs down the outside of the filter 14 in the annular space 39 to the bottom of the filter housing from whence it is drained away by the drainpipe 40. The drainpipe 40 as shown in FIG. 5 is controlled by a check valve 50.

The wash liquid 48 may be hot water, a chemical solvent, or a combination of both. In passing through the filter 14, the wash liquid dissolves solidified fats and other soluble solids and carries them out of the filter. The wash system, instead of having a pump 44, may be supplied with water under pressure from a city water supply. Chemical additives may be added to the water, and a water heater is preferably provided to heat the water before it reaches the standpipe 41.

FIG. 4 shows a modified embodiment of the invention in which a blower 18' is mounted on top of a filter casing 13'. The filter casing 13' is similar to the filter casing 13 illustrated in FIGS. 1-3 but instead of having a top closure 30 and a side outlet port 17, as does the casing 13, the modified casing 13 has the blower 18' mounted over the top opening 51 of the casing by means of a mounting plate 52. The blower 18' is driven by an electric motor 20' through a belt and pulley drive assembly generally indicated by the reference numeral 53. The blower 18' creates a negative pressure within the filter casing 13' and discharges gases to atmosphere through the discharge port 54. A cover 55 is provided over the blower 18' and the electric motor 20' to protect the equipment from the elements of nature. The embodiment shown in FIG. 4 is like the embodiment of FIGS. 1-3 in other respects except as described above.

Referring again to FIG. 2, it will be noted that the filter housing 13 where it passes through the kitchen roof 21 is sealed with respect to the roof by means of flashing 56. It will be further noted that the filter closure 26 is biased against the end of the filter 14 by a coil spring 57 interposed between the filter housing cap 30 and the cover 26. In the event that the filter should become clogged, the bias of the spring 57 is such as to permit the cover 26 to open under the negative pressure created by the blower 18 and to bypass gases from the filter chamber 24 around the filter directly to the outlet port 17.

The method of this invention generally comprises collecting smoke and other gases containing aerosolized liquid and solid particles from a cooking area, passing the smoke and other gases through a coalescing filter, which coalesces and removes from the air stream submicron size and larger aerosol particles, and discharging the gases into the atmosphere substantially free of all visible emissions. A further step in the process includes the periodic washing of the filter with a solvent applied under pressure against the filter.

It is within the scope of this invention to use multiple coalescent filters in parallel as an alternative to the use of a single coalescent filter.

It is important for the conservation of energy to maintain the lowest pressure drop across the filter 14 compatible with the efficient operation of the filter. The total system pressure drop determines the size Horsepower motor required to produce the necessary vacuum on the negative side of the system. The lower the pressure drop is, the smaller the size of the motor required and the less energy used.

The size and density of the glass fibers in the fiber bed 37 of the coalescing filter 14 as suggested by U.S. Pat. No. 3,540,190 may be selected within the fiber diameter range between about 5 and about 30 microns, and the fiber bed may be compressed to a bulk density of between about 5 to 20 pounds per cubic foot. Since the density of the fiber bed 37 is a factor determining the pressure drop across the filter 14, the least dense bed compatible with efficient removal of all visible emissions from the ventilator systems 10 and 10' should be chosen in order to keep energy expenditure to a minimum.

While in the foregoing there has been described and shown a preferred embodiment of the invention, various modifications and equivalents may be resorted to within the spirit and scope of the invention as claimed.

What is claimed is:

1. Pollution control apparatus for removing substantially all visible emissions from the ventilation systems of kitchens having a cooking area comprising a hood positioned above the cooking area of a kitchen, a ventilation duct means connected to the hood and having an outlet opening to the atmosphere outside of the kitchen for conveying gases collected by the hood to the atmosphere outside of the kitchen, an aersol particle coalescing filter enclosed within the ventilation duct means and a blower means connected with the outlet of the ventilation duct means for drawing gases from the hood through the duct means and the aerosol particle coalescing filter and for discharging the gases into the atmosphere outside of the kitchen after the aerosol particles have been coalesced and removed from the gas stream by the coalescing filter, said coalescing filter being an elongated vertically oriented cylindrical filter comprising an annular bed of unbonded glass fibers, said glass fibers having diameters between about 5 microns and 30 microns and said fiber bed being compressed to a bulk density of between about 5 and 20 lbs. per cubic foot, said ventilation duct including a vertically oriented filter housing in which said filter is coaxially mounted, an annular bottom plate closing the bottom of said filter housing having said filter supported thereon, sealing means interposed between said filter and said bottom plate to seal said filter relative to said bottom plate, said bottom plate having a central opening therein communicating with the inside of said cylindrical filter, a closure covering the end of said filter opposite said bottom plate, an annular space between said filter and said filter housing, the gases from said hood being caused to flow upwardly through the opening in said bottom plate into said cylindrical filter, from whence they pass radially outwardly through the filter into said annular space, the aerosol particles being coalesced by said cylindrical filter and removed from the gas stream, the coalesced liquid aerosol particles flowing by gravity to the bottom of said filter housing within said annular space, said hood being elongated horizontally and mounted horizontally above the cooking area of the kitchen and having an open bottom to receive smoke and gases therethrough, and a top which has an aperture therein and is otherwise closed, said filter housing being disposed vertically adjacent and above said aperture in the top of said hood, and extending upwardly through the roof of said kitchen.

2. The apparatus according to claim 1 wherein said filter housing has a side outlet port, said blower being connected to said outlet port through said duct means, and a cap removably mounted on the top of said filter housing.

3. The apparatus according to claim 1 wherein said blower is mounted on top of said filter housing.

4. The apparatus according to claim 1 including automatic means for periodically washing said filter.

5. The apparatus according to claim 4 wherein said automatic washing means includes a vertical standpipe mounted concentrically within said filter, a source of wash liquid, and means for periodically supplying pressurized wash liquid to said standpipe, said standpipe having a plurality of spray nozzles mounted thereon in plural sets of plural angularly spaced nozzles, said sets being vertically spaced at intervals along said standpipe so as to direct wash liquid radially outwardly against said filter.

6. The apparatus according to claim 5 together with drain means in said bottom plate to drain dirty wash liquid collecting on said bottom plate to a waste receiver.

* * * * *